United States Patent
Tsutsui et al.

(10) Patent No.: US 9,359,538 B2
(45) Date of Patent: Jun. 7, 2016

(54) SEALANT FOR USE IN INK JET RECORDING HEADS AND INK JET RECORDING HEAD

(71) Applicant: CANON KABUSHIKI KAISHA, Tokyo (JP)

(72) Inventors: Satoshi Tsutsui, Yokohama (JP); Etsuko Sawada, Tokyo (JP); Yohei Hamade, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/506,877

(22) Filed: Oct. 6, 2014

(65) Prior Publication Data

US 2015/0116427 A1    Apr. 30, 2015

(30) Foreign Application Priority Data

Oct. 30, 2013    (JP) .................................. 2013-225695

(51) Int. Cl.
*C09J 163/00*    (2006.01)
*B41J 2/14*    (2006.01)

(52) U.S. Cl.
CPC ............ *C09J 163/00* (2013.01); *B41J 2/14024* (2013.01); *B41J 2/14072* (2013.01)

(58) Field of Classification Search
CPC .. C09J 163/00; B41J 2/14024; B41J 2/14072; B41J 2/1753
USPC .......................................... 347/65, 58, 59, 49
See application file for complete search history.

(56) References Cited

U.S. PATENT DOCUMENTS

| | | |
|---|---|---|
| 2013/0216958 A1 | 8/2013 | Tsutsui et al. |
| 2014/0272725 A1 | 9/2014 | Hamade et al. |
| 2014/0309329 A1 | 10/2014 | Sawada et al. |
| 2014/0311661 A1 | 10/2014 | Tsutsui et al. |

FOREIGN PATENT DOCUMENTS

| | | | |
|---|---|---|---|
| JP | 2002-302536 A | 10/2002 | |
| JP | WO 2013/157659 | * 10/2013 | ................. B41J 2/16 |
| WO | 2013/157659 A1 | 10/2013 | |

OTHER PUBLICATIONS

U.S. Appl. No. 14/383,223, filed Sep. 5, 2014, Sawada et al.
U.S. Appl. No. 15/005,268, filed Jan. 25, 2016, Sawada et al.

* cited by examiner

*Primary Examiner* — Henok Legesse
(74) *Attorney, Agent, or Firm* — Fitzpatrick, Cella, Harper & Scinto (57) ABSTRACT

Provided is a sealant for use in ink jet recording heads, comprising a cationically polymerizable resin; a fluorine-containing compound that is liquid at a temperature in a range of 20° C.±15° C.; and a cationic polymerization initiator.

16 Claims, 2 Drawing Sheets

SEALANT FOR USE IN INK JET RECORDING HEADS AND INK JET RECORDING HEAD

BACKGROUND OF THE INVENTION

1. Field of the Invention

The present invention relates to a sealant to be used in an ink jet recording head for ejecting ink, and to an ink jet recording head using the sealant.

2. Description of the Related Art

Figure 1:
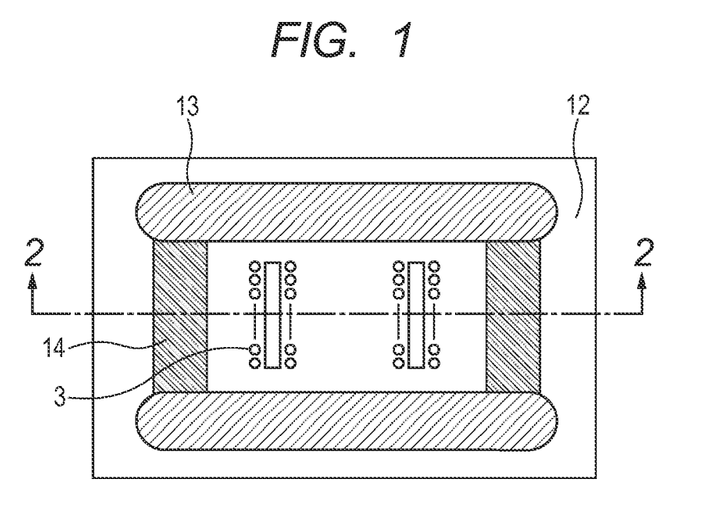
FIG. 1 is a schematic top view illustrating a construction example of an ink jet recording head.
Figure 2:
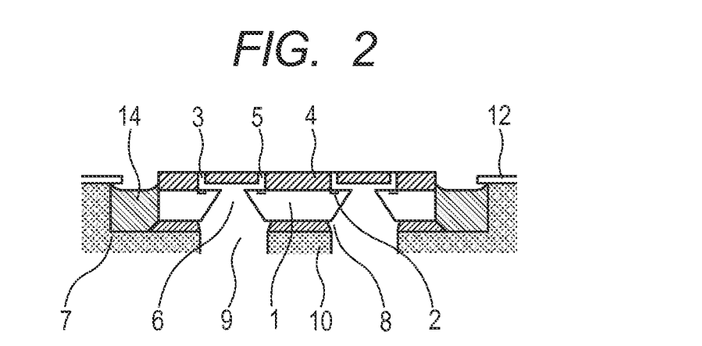
FIG. 2 is a schematic sectional view illustrating the construction example of the ink jet recording head.
Figure 3:
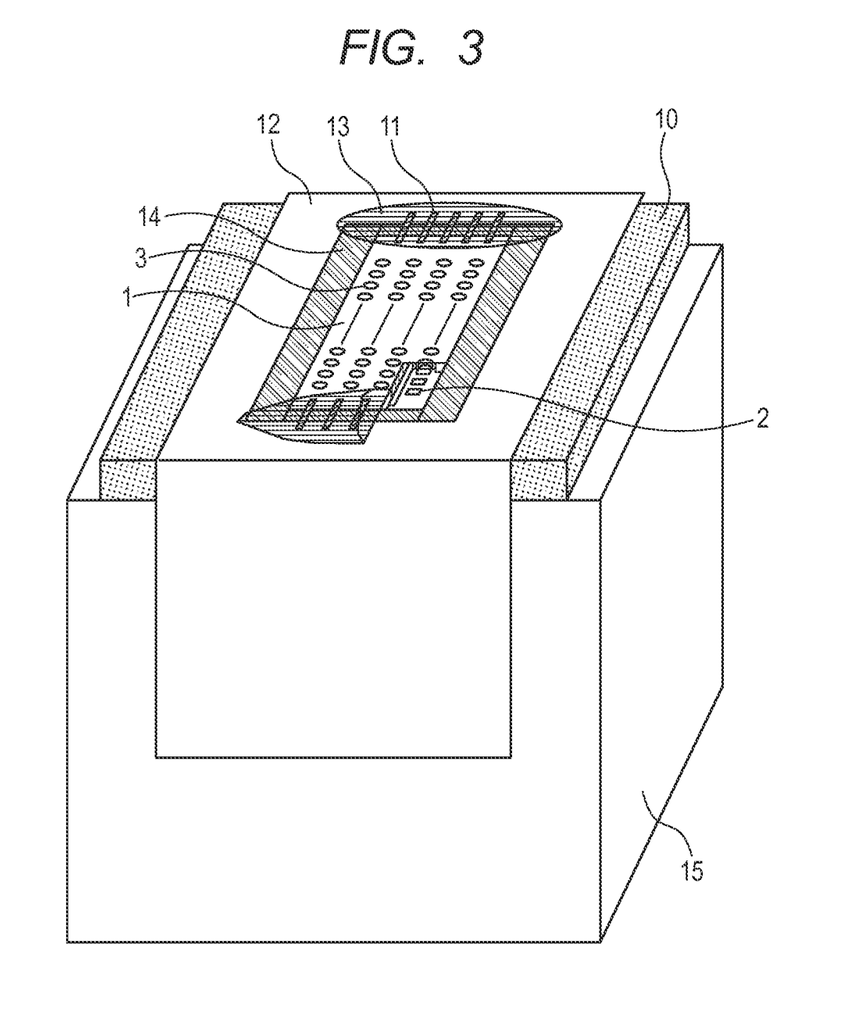
FIG. 3 is a schematic perspective view illustrating the construction example of the ink jet recording head.

Available as a liquid ejection head for ejecting a liquid is, for example, an ink jet recording system for ejecting ink onto a recording medium to perform recording. An ink jet recording head of the ink jet recording system is constructed as illustrated in, for example, FIGS. 1 to 3. FIG. 1 is a schematic view illustrating a top surface of the ink jet recording head and FIG. 2 is a schematic view illustrating a section of the ink jet recording head taken along the line 2-2 of FIG. 1. In addition, FIG. 3 is a schematic perspective view of the ink jet recording head. In FIGS. 1 and 2, an ejection element substrate includes a substrate 1 and a flow-path-forming member 4 formed on the substrate 1. The flow-path-forming member 4 forms an ejection port 3 for ejecting a liquid such as ink and a liquid flow path 5 communicating with the ejection port 3. In addition, the flow-path-forming member 4 may have a liquid-repellent layer (not shown) on an opening surface side of the ejection port. The substrate 1 includes an energy-generating element 2 for generating energy needed for the ejection on its surface (also referred to as "first surface"), and includes a supply port 6 for supplying the liquid to the liquid flow path 5. The ejection element substrate is bonded onto a device hole 7 of a support member 10 having a communication port 9, which communicates with the supply port 6, by an adhesive 8. In addition, after the ejection element substrate has been placed on the support member 10, the ejection element substrate is electrically connected to an electric wiring substrate 12. The ejection element substrate and the electric wiring substrate 12 are electrically connected to each other by, for example, an electrical connection portion 11 (see FIG. 3). The liquid ejection head includes the ejection element substrate, the electric wiring substrate 12 for transmitting an electrical signal for ejecting the liquid to the ejection element substrate, and a tank portion 15 (see FIG. 3) for storing the liquid. In addition, the electrical connection portion 11 between the ejection element substrate and the electric wiring substrate 12 is protected by an electrical-section-sealing portion 13. In addition, a side surface of the ejection element substrate is protected by a periphery-sealing portion 14, and hence the liquid is prevented from accumulating in a space between the ejection element substrate and the device hole 7 of the support member.

A sealant to be used in the ink jet recording head is placed in such a severe environment that the sealant is brought into contact with inks of respective colors containing alkaline and polar solvents and showing different properties. The sealant is required to continue maintaining adhesion reliability and electrical sealing reliability in such condition.

In view of the foregoing, Japanese Patent Application Laid-Open No. 2002-302536 discloses a sealant containing a resin excellent in ink resistance as a main agent, and containing an additive or a filler.

SUMMARY OF THE INVENTION

According to an embodiment of the present invention, there is provided a sealant for use in ink jet recording heads, comprising a cationically polymerizable resin; a fluorine-containing compound that is liquid at a temperature in a range of 20° C.±15° C.; and a cationic polymerization initiator.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the case of the sealant described in Japanese Patent Application Laid-Open No. 2002-302536, the sealant may absorb ink to swell depending on, for example, the kind of the ink, the environment under which the sealant is used, and the time period for which the sealant is used. When the sealant swells, positional shift of an ejection element substrate occurs and hence stable ejection of the ink is hindered in some cases.

In addition, when the sealant is filled with a filler, the viscosity of the sealant may increase. For example, when the sealant is used in a periphery-sealing portion, in general, the sealant is applied to device holes on two peripheral sides on sides on which no electrical connection portions are placed out of the four peripheral sides of the ejection element substrate, and the sealant is caused to flow into device holes on two peripheral sides on sides where electrical connection portions are placed out of the four peripheral sides by a capillary force. Accordingly, when the viscosity of the sealant is high, a problem in that its flowability reduces and hence the sealant hardly flows into the periphery of the ejection element substrate occurs.

An object of the present invention is to provide a sealant for use in ink jet recording heads that is excellent in flowability, has liquid repellency, and has suppressed ink absorption.

A sealant for use in ink jet recording heads according to this embodiment is described below.

The sealant for use in ink jet recording heads according to this embodiment contains a cationically polymerizable resin, a fluorine-containing compound that is liquid at a temperature in the range of 20° C.±15° C., and a cationic polymerization initiator.

Cationically Polymerizable Resin

The cationically polymerizable resin means a resin having a cationically polymerizable group such as a vinyl group or a cyclic ether group. Examples of the cationically polymerizable group include an epoxy group, an oxetane group, a vinyl group, and a vinyl ether group. Although the cationically polymerizable resin is not particularly limited, examples thereof include an epoxy resin, an oxetane resin, an acrylic resin, and a styrene resin. Further examples thereof include a vinyl ether resin and a propenyl ether resin. One kind of the cationically polymerizable resins may be used alone, or two or more kinds thereof may be used in combination.

Although the epoxy resin is not particularly limited, examples thereof include a bisphenol-type epoxy resin, a bromine-containing epoxy resin, phenol- and cresol-type epoxy resins, a cyclic aliphatic epoxy resin, a glycidyl ester-based epoxy resin, and a heterocyclic epoxy resin. A resin obtained by subjecting such resins to silicone modification, polybutadiene modification, or urethane modification, or by making the resins polyfunctional with pentaerythritol, trimethylolpropane, glycerin, or the like is also usable.

Although an acrylic resin, a styrene resin, modified products thereof, and the like may be used as the cationically polymerizable resin, an epoxy resin having an epoxy group in the molecule thereof can be preferably used because of its excellent chemical resistance. It is also preferred that an epoxy resin and an oxetane resin be used in combination as the cationically polymerizable resins.

Of those, a polyfunctional epoxy resin having a plurality of epoxy groups in the molecule thereof is preferred. Examples of such polyfunctional epoxy resin include a polyfunctional alicyclic epoxy resin, a polyfunctional phenol novolac-type epoxy resin, a polyfunctional orthocresol novolac-type epoxy resin, a polyfunctional triphenyl-type novolac-type epoxy resin, and a polyfunctional bisphenol A novolac-type epoxy resin. Of those, a polyfunctional bisphenol A novolac-type epoxy resin, a polyfunctional alicyclic epoxy resin, or a polyfunctional phenol novolac-type epoxy resin is preferably used. The functionality of the resin is preferably bifunctional or more, and the resin more preferably has an even larger number of functional groups. Specifically, the functionality is more preferably trifunctional or more, still more preferably pentafunctional or more. For example, "EPIKOTE 157S70" manufactured by Japan Epoxy Resin Co., "EPICLON N-865" manufactured by DIC Corporation, or "EHPE 3150" manufactured by Daicel Corporation is available as a commercial product and more preferably used.

The softening point of the cationically polymerizable resin, which is not particularly limited, is preferably from 50° C. to 180° C., more preferably from 60° C. to 160° C.

The content of the cationically polymerizable resin is preferably from 40 mass % to 99 mass %, more preferably from 45 mass % to 95 mass %, still more preferably from 50 mass % to 90 mass % in the total solid content of the sealant. Setting the content of the cationically polymerizable resin within this range can satisfactorily exhibit high chemical resistance and adhesiveness.

The oxetane resin has at least one oxetane group. Examples of the oxetane resin include a bisphenol A-type oxetane resin, a bisphenol oxetane resin, a bisphenol S-type oxetane resin, a xylylene-type resin, a phenol novolac-type resin, a cresol novolac-type resin, an alkylphenol novolac-type resin, a biphenol-type resin, a bixylenol-type resin, a naphthalene-type resin, a dicyclopentadiene-type resin, and an oxetane resin of a condensation product of a phenol and an aromatic aldehyde having a phenolic hydroxy group.

More specific examples of the oxetane resin include compounds represented by the following chemical formulae.

$n = 3$ n represents an integer of from 1 to 20.

In this embodiment, a low-molecular weight cationically polymerizable compound may be added as a diluent together with such cationically polymerizable resin as described above. Examples of such low-molecular weight cationically polymerizable compound include a compound having an epoxy group, a compound having a vinyl ether group, a compound having a propenyl ether group, a compound having a vinyl group, and a compound having an oxetane group. Such cationically polymerizable compound may be monofunctional or may be polyfunctional.

Examples of the compound having a vinyl ether (hereinafter abbreviated as VE) group include a monofunctional VE and a polyfunctional VE. Examples of the monofunctional VE (for example, C3 or more and Mn=1,000 or less) include an alkyl VE (such as methyl VE, ethyl VE, butyl VE, isobutyl VE, cyclohexyl VE, 2-chloroethyl VE, 2-phenoxyethyl VE, 2-hydroxyethyl VE, 4-hydroxybutyl VE, stearyl VE, 2-acetoxyethyl VE, diethylene glycol monoVE, 2-ethylhexyl VE, dodecyl VE, or octadecyl VE), an alkenyl VE (such as allyl VE, 2-methacryloyloxyethyl VE, or 2-acryloyloxyethyl VE), and an aryl VE (such as phenyl VE or p-methoxyphenyl VE). In addition, examples of the polyfunctional VE (for example, C6 or more and Mn=1,000 or less) include 1,4-butanediol diVE, triethylene glycol diVE, 1,4-benzene diVE, hydroquinone diVE, cyclohexanedimethanol diVE, diethylene glycol diVE, dipropylene glycol diVE, and hexanediol diVE.

Examples of the compound having a propenyl ether (hereinafter abbreviated as PPE) group include a monofunctional PPE and a polyfunctional VE. Examples of the monofunctional PPE (for example, C4 or more and Mn: 1,000 or less) include an alkyl PPE (such as methyl PPE, ethyl PPE, butyl PPE, isobutyl PPE, cyclohexyl PPE, 2-chloroethyl PPE, 2-phenoxyethyl PPE, 2-hydroxyethyl PPE, 4-hydroxybutyl PPE, stearyl PPE, 2-acetoxyethyl PPE, diethylene glycol monoPPE, 2-ethylhexyl PPE, dodecyl PPE, or octadecyl PPE), an alkenyl PPE (such as allyl PPE, 2-methacryloyloxyethyl PPE, or 2-acryloyloxyethyl PPE), and an aryl PPE (such as phenyl PPE or p-methoxyphenyl PPE). Examples of the polyfunctional PPE (for example, C6 or more and Mn=1,000 or less) include 1,4-butanediol diPPE, triethylene glycol diPPE, 1,4-benzene diPPE, hydroquinone diPPE, cyclohexanedimethanol diPPE, diethylene glycol diPPE, dipropylene glycol diPPE, and hexanediol diPPE.

In addition, sealants preferably used are those which easily flow into a space between the ejection element substrate and a support member, easily relieve a stress generated by a difference in linear expansion coefficient between the sealant and the ejection element substrate, and have good flowability. The viscosity of the sealant is preferably low from such viewpoints. The cationically polymerizable resin is preferably an epoxy resin having a polybutadiene skeleton, an epoxy resin having a silicone skeleton, or an epoxy resin having silicone and polybutadiene skeletons from such viewpoints. The polybutadiene skeleton means a skeleton containing a 1,4-butadiene or 1,2-butadiene structure in its structure, and the other structure is not particularly limited. Commercial products of such resins include "R657" manufactured by Sartomer Company, Inc., "JP200" manufactured by Nippon Soda Co., Ltd., "DENAREX R-45EPT" manufactured by Nagase ChemteX Corporation, "BF1000" manufactured by ADEKA CORPORATION, "PB3600" manufactured by Daicel Corporation, and "E-700-3.5" manufactured by Nippon Petrochemicals Co., Ltd. In addition, the epoxy equivalent of such epoxy resin is preferably large and the epoxy equivalent is preferably 1,000 or more. When the epoxy equivalent is 1,000 or more, a cured product of the resin does not become excessively hard, and hence the cracking of the cured product or the ejection element substrate under a low-temperature environment can be reduced. The epoxy equivalent is a value in conformity with JIS K7232-1986.

It is preferred that an electrical-section-sealing portion and the periphery-sealing portion be simultaneously formed by using the sealant according to this embodiment.

Cationic Polymerization Initiator

Although the cationic polymerization initiator is not particularly limited, examples thereof can include a thermal cationic polymerization initiator and a photocationic polymerization initiator. One kind of those initiators may be used alone, or two or more kinds thereof may be used in combination.

The thermal cationic polymerization initiator is, for example, an aromatic sulfonium salt. Commercial products thereof include SAN-AID SI-60L (trade name), SAN-AID SI-80L (trade name), and SAN-AID SI-100L (trade name) sold by SANSHIN CHEMICAL INDUSTRY CO., LTD. Other commercial products thereof include CP-66 (trade name) and CP-77 (trade name) sold by ADEKA CORPORATION. In addition, the aromatic onium salt may be used in combination with a reducing agent.

Examples of the photocationic polymerization initiator include an aromatic iodonium salt and an aromatic sulfonium salt. Commercial products of the aromatic iodonium salt include DPI-105 (trade name), MPI-103 (trade name), and MPI-105 (trade name) sold by Midori Kagaku Co., Ltd. Commercial products of the aromatic sulfonium salt include ADK Optomer SP-170 (trade name) and SP-172 (trade name) sold by ADEKA CORPORATION.

In addition, the electrical-section-sealing portion and the periphery-sealing portion are preferably formed by using the same sealant so that the curing of a main agent is not inhibited even when a scramble for a curing agent occurs at an interface between the electrical-section-sealing portion and the periphery-sealing portion.

Fluorine-Containing Compound

The fluorine-containing compound is liquid at normal temperature. The term "normal temperature" as used in the present invention refers to a temperature state in the range of 20° C.±15° C., i.e., in the range of from 5° C. or more to 35° C. or less as in the definition of the Japanese Industrial Standards (JIS Z 8703). The use of such fluorine-containing compound can bring the flowability of the sealant into a good state. It should be noted that the phrase "liquid at normal temperature" refers to a substance whose solidifying point is a temperature lower than 5° C. One kind of the fluorine-containing compounds can be used, or two or more kinds thereof can be used in combination.

In addition, the fluorine-containing compound is preferably liquid at 5° C. or more and 35° C. or less, and at a pressure in the range of from 86 kPa or more to 106 kPa or less.

The fluorine-containing compound preferably contains a perfluoroalkyl group, a perfluoroalkoxy group, a perfluoroalkylene group, or a perfluoropolyether group (any such group is hereinafter sometimes abbreviated as "fluorine-containing group") from the viewpoint of the liquid repellency with respect to ink.

In addition, the average molecular weight of the perfluoropolyether group is preferably 500 or more.

Although the perfluoroalkyl group is not particularly limited, the group is, for example, a group represented by the formula (1-1).

(In the formula (1-1), k represents an integer of 3 or more.)

In the formula (1-1), k preferably represents an integer of from 3 to 12.

Although the perfluoroalkylene group is not particularly limited, the group is, for example, a group represented by the formula (1-2).

(In the formula (1-2), k represents an integer of 3 or more.)

In the formula (1-2), k preferably represents an integer of from 3 to 12.

Although the perfluoropolyether group is not particularly limited, the group is, for example, a poly(perfluoroalkyleneoxy) group having a structure in which a plurality of perfluoroalkyleneoxy groups range as structural units. The numbers of carbon atoms of the perfluoroalkylene groups in the poly(perfluoroalkyleneoxy) group are each independently preferably from 1 to 12, more preferably 1, 2, 3, 4, 5, or 6. The perfluoroalkylene groups may each independently be linear or may each independently be branched. In addition, the perfluoroalkylene groups as structural units in the poly(perfluoroalkyleneoxy) group may be independent of each other.

Although the perfluoropolyether group is not particularly limited, the group is, for example, a group represented by the formula (2).

(In the formula (2), p, q, r, and s each independently represent an integer of 0, or 1 or more, and at least one of p, q, r, and s represents an integer of 1 or more.)

p preferably represents an integer of from 0 to 60. q preferably represents an integer of from 0 to 20. r preferably represents an integer of from 0 to 60. s preferably represents an integer of from 0 to 30.

When the numbers (k, p, q, r, and s) of the repeating units of those liquid-repellent groups are compared, in general, in commercial liquid repellents, p, q, r, and s are larger than k in many cases. Accordingly, in general, out of the commercial liquid repellents, a liquid repellent having a perfluoropolyether group is suitably used because the liquid repellent contains a larger number of fluorine atoms in the molecule thereof than a liquid repellent having a perfluoroalkyl group and hence shows higher liquid repellency. In addition, when the weight-average molecular weight of different perfluoropolyether groups in the same molecule and that of the perfluoropolyether groups of different molecules are excessively small, the liquid repellency may not be expressed. Accordingly, a liquid repellent which is a compound having a weight-average molecular weight of 500 or more is preferred. The weight-average molecular weight is more preferably 1,000 or more. It should be noted that in a fluorine-containing group such as a perfluoroalkyl group or a perfluoropolyether group, a fluorinated alkyl chain is known to segregate toward an air interface side and hence the liquid repellency of the surface of the sealant can be improved. The weight-average molecular weight of the perfluoropolyether groups can be measured by, for example, mass spectrometry (MALDI-MS), $^{19}$F-NMR, or gel permeation chromatography (GPC).

The fluorine-containing compound preferably has an inorganic reactive group from the viewpoints of the mechanical strength and ink resistance of the sealant. The inorganic reactive group is preferably a hydrolyzable silyl group from the viewpoint of general purposes. The fluorine-containing compound is preferably a fluorine-containing compound having a hydrolyzable silyl group at a terminal portion thereof. In addition, the fluorine-containing compound is preferably a hydrolyzable silane compound having a perfluoroalkyl group, a perfluoroalkoxy group, a perfluoroalkylene group, or a perfluoropolyether group. When the compound has a hydrolyzable silyl group, hydrolysis caused by moisture in the air occurs to produce a silanol group. Further, a dehydration condensation reaction is accelerated in the presence of an acid which is generated by the cationic polymerization initiator to produce a siloxane bond, and hence the mechanical strength and the ink resistance improve. In addition, when an epoxy resin is used as the main agent, the mechanical strength and the ink resistance are improved by a reaction between the silanol group and an epoxy group of the epoxy resin.

Preferred specific examples of the fluorine-containing compound having a hydrolyzable silyl group include a compound represented by the formula (3-1), a compound represented by the formula (3-2), a compound represented by the formula (4), a compound represented by the formula (5-1), a compound represented by the formula (5-2), a compound represented by the formula (6-1), and a compound represented by the formula (6-2). That is, the fluorine-containing compound having a hydrolyzable silyl group is preferably at least one kind selected from the group consisting of the compound represented by the formula (3-1), the compound represented by the formula (3-2), the compound represented by the formula (4), the compound represented by the formula (5-1), the compound represented by the formula (5-2), the compound represented by the formula (6-1), and the compound represented by the formula (6-2).

(In the formula (3-1), Rf represents a perfluoroalkyl group or a perfluoroalkoxy group, X represents a single bond or a divalent organic group, R represents a hydrolyzable group, Y represents a non-hydrolyzable group, a represents an integer of 1, 2, or 3, when a plurality of R's are present, the plurality of R's may be independent of each other, and when a plurality of Y's are present, the plurality of Y's may be independent of each other.)

(In the formula (3-2), Rf represents a perfluoropolyether group, X represents a single bond or a divalent organic group, R represents a hydrolyzable group, Y represents a non-hydrolyzable group, a represents an integer of 1, 2, or 3, when a plurality of R's are present, the plurality of R's may be independent of each other, and when a plurality of Y's are present, the plurality of Y's may be independent of each other.)

In the formula (3-1) and the formula (3-2), X represents, for example, a single bond, an oxygen atom, an alkylene group having 1 to 12 carbon atoms that may have an ether group, or a fluoroalkylene group having 1 to 12 carbon atoms that may have an ether group. Examples of the alkylene group as X include a methylene group, an ethylene group, and a propylene group. When X represents an organic group, the number of carbon atoms of X is preferably 1, 2, 3, 4, 5, or 6. The alkylene group and the fluoroalkylene group may be linear or may be branched.

(In the formula (4), Rf represents a perfluoroalkylene group or a perfluoropolyether group, R represents a hydrolyzable group, Y represents a non-hydrolyzable group, A represents a single bond or a divalent organic group, a represents an integer of 1, 2, or 3, and R's, Y's, and A's may be independent of each other for each silicon atom to which the groups are bonded.)

In the formula (4), A represents, for example, a single bond, an oxygen atom, an alkylene group having 1 to 12 carbon atoms that may have an ether group, or a fluoroalkylene group having 1 to 12 carbon atoms that may have an ether group. Examples of the alkylene group as A include a methylene group, an ethylene group, and a propylene group. When A represents an organic group, the number of carbon atoms of A is preferably 1, 2, 3, 4, 5, or 6. The alkylene group and the fluoroalkylene group may be linear or may be branched.

(In the formula (5-1), Rf represents a perfluoroalkyl group or a perfluoroalkoxy group, R represents a hydrolyzable group, Y represents a non-hydrolyzable group, A represents a trivalent organic group, Q represents a divalent organic group, Z represents a hydrogen atom, an alkyl group having 1 to 6 carbon atoms, or a fluoroalkyl group having 1 to 6 carbon atoms, m represents an integer of 1 or more, a represents an integer of 1, 2, or 3, and when m represents an integer of 2 or more, A's, R's, and Y's may be independent of each other for each silicon atom to which the groups are bonded.)

(In the formula (5-2), Rf represents a perfluoropolyether group, R represents a hydrolyzable group, Y represents a non-hydrolyzable group, A represents a trivalent organic group, Q represents a divalent organic group, Z represents a hydrogen atom, an alkyl group having 1 to 6 carbon atoms, or a fluoroalkyl group having 1 to 6 carbon atoms, m represents an integer of 1 or more, a represents an integer of 1, 2, or 3, and when m represents an integer of 2 or more, A's, R's, and Y's may be independent of each other for each silicon atom to which the groups are bonded.)

In the formula (5-1) and the formula (5-2), the number of carbon atoms of A is preferably from 1 to 12, more preferably from 1 to 10, particularly preferably 1, 2, 3, 4, 5, or 6. A represents, for example, a trivalent and saturated hydrocarbon group.

In the formula (5-1) and the formula (5-2), the number of carbon atoms of Q is preferably from 1 to 12, more preferably from 1 to 10, particularly preferably 1, 2, 3, 4, 5, or 6. Q represents, for example, an oxygen atom, an alkylene group having 1 to 12 carbon atoms that may have an ether group, or a fluoroalkylene group having 1 to 12 carbon atoms that may have an ether group. Examples of the alkylene group as Q include a methylene group, an ethylene group, and a propylene group. The alkylene group and the fluoroalkylene group may be linear or may be branched.

In the formula (5-1) and the formula (5-2), m represents preferably an integer of from 1 to 6, more preferably an integer of 1, 2, or 3.

(In the formula (6-1), Rf represents a perfluoroalkyl group or a perfluoroalkoxy group, represents a hydrolyzable group, Y represents a non-hydrolyzable group, A represents a single bond or a divalent organic group, Q represents a divalent or trivalent organic group, n represents an integer of 1 or 2, a represents an integer of 1, 2, or 3, and when n represents 2, A's, R's, and Y's may be independent of each other for each silicon atom to which the groups are bonded.)

(In the formula (6-2), Rf represents a perfluoropolyether group, R represents a hydrolyzable group, Y represents a non-hydrolyzable group, A represents a single bond or a divalent organic group, Q represents a divalent or trivalent organic group, n represents an integer of 1 or 2, a represents an integer of 1, 2, or 3, and when n represents 2 or 3, A's, R's, and Y's may be independent of each other for each silicon atom to which the groups are bonded.)

In the formula (6-1) and the formula (6-2), the number of carbon atoms of Q is preferably from 1 to 12, more preferably from 1 to 10, particularly preferably 1, 2, 3, 4, 5, or 6. Q represents, for example, an oxygen atom, an alkylene group having 1 to 12 carbon atoms that may have an ether group, or a fluoroalkylene group having 1 to 12 carbon atoms that may have an ether group. Examples of the alkylene group as Q include a methylene group, an ethylene group, and a propylene group. The alkylene group and the fluoroalkylene group may be linear or may be branched. In addition, Q represents, for example, a trivalent and saturated hydrocarbon group.

The compound represented by the formula (6-1) or the compound represented by the formula (6-2) preferably has a secondary amide structure or a tertiary amide structure, more preferably has a tertiary amide structure.

In the formulae, examples of the hydrolyzable group include a hydrogen atom, a halogen atom (such as a fluorine atom, a chlorine atom, or an iodine atom), an alkoxy group, and an amino group. Of those, an alkoxy group is preferred, and a methoxy group or ethoxy group having high general purposes is more preferred.

In the formulae, the non-hydrolyzable group is, for example, an alkyl group. The alkyl group is preferably a methyl group or an ethyl group.

Preferred specific examples of the fluorine-containing compound having a hydrolyzable silyl group include compounds represented by the formulae (7) to (11).

(In the formula (7), t represents an integer of 3 or more.)

In the formula (7), t preferably represents an integer of 10 or less.

(In the formula (8), u represents an integer of from 3 to 60 and v represents an integer of 1, 2, or 3.)

(In the formula (9), w represents an integer of from 3 to 60.)

(In the formula (10), x represents an integer of from 1 to 20 and y represents an integer of from 1 to 30.)

(In the formula (11), z represents an integer of from 3 to 60.)

In addition, a condensation product formed of a hydrolyzable silane compound having a perfluoroalkyl group, a perfluoroalkoxy group, a perfluoroalkylene group, or a perfluoropolyether group (such group is hereinafter sometimes referred to as "fluorine-containing group") and a hydrolyzable silane compound having a cationically polymerizable group can be suitably used as the fluorine-containing compound from the viewpoints of its reactivity with the main agent (especially an epoxy resin), the mechanical strength, and the ink resistance. By virtue of the presence of the hydrolyzable silane compound having a cationically polymerizable group, an ether bond is formed between the fluorine-containing compound and the main agent (especially an epoxy resin) in the presence of the cationic polymerization initiator due to a reaction of the cationically polymerizable groups. As a result, the mechanical strength and ink resistance of the cured sealant improve.

The hydrolyzable silane compound having a cationically polymerizable group is represented by, for example, the following formula (20).

(In the formula (20), $R_c$ represents a non-hydrolyzable group having a cationically polymerizable group, $R_1$ represents a non-hydrolyzable group, X represents a hydrolyzable group, b represents an integer of from 0 to 2, and when b represents 2, X's may be independent of each other for each silicon atom to which the groups are bonded.)

Examples of the cationically polymerizable group include a vinyl ether group, an epoxy group, and an oxetane group. Of those, an epoxy group is preferred from the viewpoints of easy availability and reaction control.

$R_c$ represents, for example, a glycidoxypropyl group or an epoxycyclohexylethyl group.

In the formula (20), examples of the hydrolyzable group represented by X include a hydrogen atom, a halogen atom (such as a fluorine atom, a chlorine atom, or an iodine atom), an alkoxy group, and an amino group. Of those, an alkoxy group is preferred, and a methoxy group or ethoxy group having high general purposes is more preferred.

In the formula (20), the non-hydrolyzable group represented by $R_1$ is, for example, an alkyl group. The alkyl group is preferably a methyl group or an ethyl group.

Examples of the hydrolyzable silane compound having a cationically polymerizable group represented by the formula (20) include glycidoxypropyltrimethoxysilane, glycidoxypropyltriethoxysilane, epoxycyclohexylethyltrimethoxysilane, and epoxycyclohexylethyltriethoxysilane. The hydrolyzable silane compound having a cationically polymerizable group is not limited to those compounds. In addition, one kind of the hydrolyzable silane compounds having a cationically polymerizable group may be used alone, or two or more kinds thereof may be used in combination.

The compounding proportion of the hydrolyzable silane compound having a cationically polymerizable group is preferably from 30 to 70 mol % when the total number of moles of the hydrolyzable silane compound to be used is taken to be 100 mol %. The compounding proportion is more preferably from 40 to 55 mol %.

Further, a condensation product formed of a hydrolyzable silane compound having a perfluoroalkyl group, a perfluoroalkoxy group, a perfluoroalkylene group, or a perfluoropolyether group, a hydrolyzable silane compound having a cationically polymerizable group, and an alkyl-substituted hydrolyzable silane compound can be preferably used as the fluorine-containing compound. The alkyl-substituted hydrolyzable silane compound increases the flexibility of the condensation product. Accordingly, the orientation of a liquid-repellent group such as a perfluoroalkyl group or a perfluoropolyether group toward the air interface side is accelerated. In addition, the cleavage of a siloxane bond is suppressed, and the liquid repellency and ink resistance are improved by the presence of an alkyl group.

The alkyl-substituted hydrolyzable silane compound is represented by, for example, the formula (30).

$$R_a\text{—SiX}_{(4-a)} \quad (30)$$

(In the formula (30), $R_a$ represents a substituted or unsubstituted alkyl group, X represents a hydrolyzable group, a represents an integer of from 0 to 3, and when a plurality of silicon atoms are present, X's may be independent of each other for each silicon atom to which the groups are bonded.)

The number of carbon atoms of $R_a$ is, for example, from 1 to 6, and is preferably from 1 to 4. $R_a$ preferably represents, for example, a methyl group, an ethyl group, or a propyl group.

Examples of the alkyl-substituted hydrolyzable silane compound represented by the formula (30) include tetramethoxysilane, tetraethoxysilane, tetrapropoxysilane, methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, and propyltripropoxysilane. The alkyl-substituted hydrolyzable silane compound is not limited to those compounds. In addition, one kind of the alkyl-substituted hydrolyzable silane compounds may be used alone, or two or more kinds thereof may be used in combination.

The compounding proportion of the alkyl-substituted hydrolyzable silane compound is preferably from 5 to 70 mol % when the total number of moles of the hydrolyzable silane compound to be used is taken to be 100 mol %. The compounding proportion is more preferably from 10 to 50 mol %.

The content of the fluorine-containing compound is preferably 5 parts by mass or more with respect to 100 parts by mass of the cationically polymerizable resin (especially an epoxy resin) from the viewpoint of imparting liquid repellency to the sealant. In addition, the content of the fluorine-containing compound is preferably 60 parts by mass or less.

In this embodiment, the incorporation of the fluorine-containing compound that is liquid at normal temperature in the range of 20° C.±15° C. into the sealant can impart the liquid repellency without reducing the flowability of the sealant. Accordingly, the sealant easily flows into the periphery of the ejection element substrate, and hence ink absorption in the sealant after its curing can be suppressed.

It should be noted that the fluorine-containing compound to be used in the sealant is preferably added to a liquid-repellent layer to be formed on a flow-path-forming member as well from the viewpoint of the uniformity of the liquid repellency of the surface of an ink jet recording head.

An ink jet recording head according to this embodiment can be produced by performing the following steps (1) to (3) in this order.

(1) The step of placing the sealant according to this embodiment in a device hole of a support member and/or an ejection element substrate, (2) the step of bonding the support member and the ejection element substrate so that the sealant flows into the periphery of the ejection element substrate, and (3) the step of curing the sealant to form a periphery-sealing portion and an electrical-section-sealing portion.

Hereinafter, the present invention is described in more detail by way of Examples and Comparative Examples. However, the present invention is by no means limited to Examples and Comparative Examples.

Sealant for Use in Ink Jet Recording Heads

Example 1

A sealant was prepared as Example 1 according to composition shown in Table 1. In the table, the term "part(s)" means "part(s) by mass."

In Example 1, a polybutadiene skeleton epoxy resin (trade name: DENAREX R-45EPT, manufactured by Nagase ChemteX Corporation) was used as a thermosetting epoxy resin. In addition, a thermal cationic polymerization initiator of an aromatic sulfonium salt (trade name: CP-77, manufactured by ADEKA CORPORATION) was used as a cationic polymerization initiator.

In Example 1, 5 parts by mass of a fluorine-containing compound A was added to the composition in addition to 100 parts by mass of the thermosetting epoxy resin and 6 parts by mass of the thermal cationic polymerization initiator. The fluorine-containing compound was added to the composition as described below. First, a solution was prepared by diluting the fluorine-containing compound with a hydrofluoroether so that the non-volatile matter content became 20%. The solution was added to the composition so that the content of the fluorine-containing compound became 5 parts by mass.

Thus, the sealant was prepared.

Example 2

A sealant was prepared in the same manner as in Example 1 except that a fluorine-containing compound B was used instead of the fluorine-containing compound A.

Example 3

A sealant was prepared in the same manner as in Example 1 except that a fluorine-containing compound C was used instead of the fluorine-containing compound A.

Example 4

A sealant was prepared in the same manner as in Example 1 except that a fluorine-containing compound D was used instead of the fluorine-containing compound A.

Example 5

A sealant was prepared in the same manner as in Example 1 except that a fluorine-containing compound E was used instead of the fluorine-containing compound A.

Example 6

A sealant was prepared in the same manner as in Example 1 except that a fluorine-containing compound F was added instead of the fluorine-containing compound A to the composition as described below.

Example 7

A sealant was prepared in the same manner as in Example 6 except that a compound represented by the formula (7) was used instead of the compound represented by the formula (11).

It should be noted that in Example 7, a fluorine-containing compound G was produced by obtaining a condensation product in the same manner as in Example 6 except that the compound represented by the formula (7) was used instead of the compound represented by the formula (11).

Comparative Example 1

A sealant was prepared in the same manner as in Example 1 except that the fluorine-containing compound A was not used.

Comparative Example 2

A sealant was prepared in the same manner as in Comparative Example 1 except that 70 parts of a fluorine-based filler that was solid at normal temperature (trade name: FA-200, manufactured by Nissan Chemical Industries, Ltd.) was added.

TABLE 1

|  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Thermosetting epoxy resin | | 100 parts | 100 parts | 100 parts | 100 parts | 100 parts | 100 parts | 100 parts | 100 parts | 100 parts |
| Cationic polymerization initiator | | 6 parts | 6 parts | 6 parts | 6 parts | 6 parts | 6 parts | 6 parts | 6 parts | 6 parts |
| Flourine-containing compound | A | 5 parts | | | | | | | | |
| | B | | 5 parts | | | | | | | |
| | C | | | 5 parts | | | | | | |
| | D | | | | 5 parts | | | | | |
| | E | | | | | 5 parts | | | | |
| | F | | | | | | 5 parts | | | |
| | G | | | | | | | 5 parts | | |
| Filler | | | | | | | | | | 70 parts |

A: A hydrolyzable silane compound having a perfluoroalkyl group represented by the formula (7), provided that t in the formula (7) represents 10.
B: A hydrolyzable silane compound having a perfluoropolyether group represented by the formula (8), provided that u and v in the formula (8) represent 20 and 3, respectively.
C: A hydrolyzable silane compound having a perfluoropolyether group represented by the formula (9), provided that w in the formula (9) represents 20.
D: A hydrolyzable silane compound having a perfluoropolyether group represented by the formula (10), provided that x and y in the formula (10) represent 20 and 10, respectively.
E: A hydrolyzable silane compound having a perfluoropolyether group represented by the formula (11), provided that z in the formula (11) represents 5.
F: A condensation product containing the hydrolyzable silane compound having a perfluoropolyether group represented by the formula (11), a hydrolysable silane compound having a cationically polymerizable group, and an alkyl-substituted hydrolyzable silane compound, provided that z in the formula (11) represents 5.
G: A condensation product containing the hydrolyzable silane compound having a perfluoroalkyl group represented by the formula (7), a hydrolyzable silane compound having a cationically polymerizable group, and an alkyl-substituted hydrolyzable silane compound, provided that t in the formula (7) represents 10.

The fluorine-containing compound F was prepared as described below. First, a compound represented by the formula (11), γ-glycidoxypropyltriethoxysilane, methyltriethoxysilane, water, and ethanol were stirred at room temperature and then refluxed for 24 hours to provide a condensation product (the fluorine-containing compound F). A solution was prepared by diluting the condensation product with ethanol so that the non-volatile matter content became 30%. The solution was added to the composition so that the content of the fluorine-containing compound F became 5 parts by mass.

Evaluation

The sealants obtained in Examples 1 to 7 and Comparative Examples 1 and 2 were evaluated for their flowability as described below. The sealant was applied to a space between the substrate 1 having an ejection energy-generating element of such a shape measuring 20 mm×20 mm with a thickness of 1.0 mm as illustrated in FIGS. 1 and 2, and the device hole 7 having a width of from 20.5 to 21 mm present in the support member 10, and the time period required for the sealant to go around to the periphery of the ejection element substrate to completely fill a portion below the electric wiring substrate 12 was measured.

In addition, each sealant was applied so as to have a shape measuring 20 mm×20 mm with a thickness of 0.15 mm, and was cured by being stored for 1 hour in an incubator for which the starting temperature was 100° C. and the rate of temperature increase was controlled to such a constant value that the temperature increased by 180° C. in 1 hour. The resultant cured product was evaluated for its ink absorptivity, liquid contact property, and liquid repellency.

Evaluation criteria for the liquid repellency are as described below.
AA: 90° or more
A: less than 90° and 75° or more
B: less than 75° and 65° or more
C: less than 65°

Table 2 shows the results for the evaluation for the flowability, the ink absorptivity, the liquid contact property, and the liquid repellency.

TABLE 2

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Flowability | AA | AA | AA | AA | AA | AA | AA | AA | C |
| Ink absorptivity | AA | AA | AA | AA | AA | AA | AA | C | A |
| Liquid contact property | AA | AA | AA | AA | AA | AA | AA | C | A |
| Liquid repellency | A | AA | A | A | AA | AA | A | C | A |

Flowability

Evaluation criteria for the flowability are as described below.
AA: less than 30 sec
A: 30 sec or more and less than 3 min
B: 3 min or more and less than 10 min
C: 10 min or more Ink Absorptivity The cured product was stored in a pressure cooker tester (PCT) at 121° C. for 10 hours under a state in which the cured product was immersed in an ink having the following composition. Then, the rate of change of the weight of the cured product before and after the storage was measured.

Ink=pure water/glycerin/Direct Black 154 (water-soluble black dye)=6/5/30/5 (mass ratio)

Evaluation criteria for the rate of change of the weight (ink absorptivity) are as described below.
AA: less than 1%
A: 1% or more and less than 2%
B: 2% or more and less than 4%
C: 4% or more Liquid Contact Property The cured product was stored in a PCT at 121° C. for 10 hours under a state in which the cured product was immersed in a clear ink obtained by removing the Direct Black 154 from the above-described ink. Then, the absorbance of the clear ink (extract) after the storage was measured. The extent to which the sealant was eluted from the cured product to the ink was evaluated by a change in the absorbance. A U-3300 spectrophotometer (manufactured by HITACHI Co.) was used in the measurement of the absorbance to measure the light absorbance in the range of from 200 to 400 nm.

Evaluation criteria for the liquid contact property are as described below. In the following description, abs represents a numerical value obtained by subtracting the light absorbance of the clear ink before the immersion of the cured product from the light absorbance of the clear ink (extract) after the storage.
AA: abs is less than 1
A: abs is more than 1 and less than 2
C: abs is more than 2

Liquid Repellency

The cured product was evaluated for its liquid repellency by measuring its dynamic receding contact angle θr with respect to pure water with an automatic contact angle meter (CA-W manufactured by Kyowa Interface Science Co., Ltd.).

Liquid repellency was imparted to the sealants obtained in Examples 1 to 7 because the sealants contained fluorine-containing compounds. As a result, the ink absorption of the sealants was suppressed, and both of its ink absorptivity and liquid contact property were good. In addition, fluorine-containing compounds that were liquid at normal temperature were added to the sealants, and hence each of the sealants went around to the periphery of the ejection element substrate within a short time period without any increase in its viscosity. In other words, its flowability was good.

The sealant obtained in Comparative Example 1 was poor in ink absorptivity and liquid contact property, and absorption supposed to originate from the sealant was observed. Accordingly, it is assumed that the sealant absorbed the ink and hence the components of the sealant were eluted.

Although the sealant obtained in Comparative Example 2 had a good ink absorptivity and good liquid contact property, the fluorine-based filler that was solid at normal temperature was added, and hence its flowability reduced and a long time period was required for the sealant to go around to the periphery of the ejection element substrate.

Ink Jet Recording Head

Examples 8 to 14, and Comparative Examples 4 and 5

In Examples 8 to 14, and Comparative Examples 4 and 5, ink jet recording heads were produced by using the sealants prepared in Examples 1 to 7, and Comparative Examples 1 and 2, respectively.

First, the constructions of the produced ink jet recording heads are described with reference to FIGS. 1 to 3. In FIG. 1, an ejection element substrate includes a substrate 1 having a supply port 6; and a flow-path-forming member 4, which forms an ejection port 3 for ejecting a liquid such as ink and a liquid flow path 5 communicating with the ejection port 3, on the substrate 1. An orifice surface on which the ejection port 3 opens is subjected to a liquid-repellent treatment, and a liquid-repellent layer (not shown) is formed on the surface of the flow-path-forming member 4. The energy-generating element 2 such as a heater element for generating energy needed for the ejection is formed on the substrate 1. In addition, the supply port 6 for supplying the liquid to the liquid flow path 5 communicates with the communication port 9 formed in the support member 10. The ejection element substrate is bonded to a device hole 7 of the support member 10 with an adhesive 8. A signal for ejecting the liquid is transmitted through an electrical connection portion 11 (see FIG. 3) provided on an electric wiring substrate 12, and the electrical connection portion 11 is sealed with an electrical-section-sealing portion 13. In addition, a space between the ejection element substrate and the support member 10 is filled and sealed with a periphery-sealing portion 14. The communication port 9 is caused to communicate with a tank portion 15 (see FIG. 3) for storing the liquid.

In Examples and Comparative Examples, the substrate 1 was formed of silicon, and an Al wiring or the like for supplying the electrical signal was formed by a film-forming technology. In addition, the supply port 6 was formed by an anisotropic etching technology. The flow-path-forming member 4 was formed on the substrate 1 by coating the substrate with a material through spin coating; and forming the ejection port 3 and the flow path 5 by means of a photolithography technology. A polyfunctional epoxy resin was used as the material for the flow-path-forming member 4. In Examples 8 to 14, the liquid-repellent layer on the surface of the flow-path-forming member 4 was formed by applying the same material as the fluorine-containing compound in the sealant. In Comparative Examples 4 and 5, the liquid-repellent layer was formed by using the fluorine-containing compound used in Example 8. Alumina was used as a material for the support member 10.

The sealant was applied to the inside of the device hole 7 present between the electrical connection portion and the ejection element substrate, and the support member, and was cured at 100° C. for 1 hour and at 180° C. for 1 hour to form the electrical-section-sealing portion 13 and the periphery-sealing portion 14.

Reliability Evaluation

In order for the ink jet recording heads obtained in Examples 8 to 14 and Comparative Examples 4 and 5 to be evaluated for their adhesion reliability and electrical sealing reliability, the ink jet recording head was charged with the ink described in the foregoing to store the ink at 60° C. for 2 months. After that, printing was performed on a 10,000-A4 sheets for printing evaluation. Table 3 shows the results of the evaluation.

TABLE 3

|  | Example 8 | Example 9 | Example 10 | Example 11 | Example 12 | Example 13 | Example 14 | Comparative Example 4 | Comparative Example 5 |
|---|---|---|---|---|---|---|---|---|---|
| Print quality | Good | Good | Good | Good | Good | Good | Good | Reduction | Reduction |

In the ink jet recording heads of Comparative Examples 4 and 5, it was confirmed that an ink droplet did not fly in a desired direction and hence the print quality reduced. This is probably because the sealant absorbed the ink to swell owing to the storage of the ink, and hence the positional shift of the ejection element substrate occurred. On the other hand, none of the ink jet recording heads of Examples showed a reduction in print quality even after the completion of the printing on the 10,000 sheets.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-225695, filed Oct. 30, 2013, which is hereby incorporated by reference herein in its entirety.

What is claimed is:

1. A sealant for use in an ink jet recording head, the sealant comprising:
a cationically polymerizable resin;
a fluorine-containing compound that is liquid at a temperature of 20° C.±15° C.; and
a cation polymerization initiator,
wherein the fluorine-containing compound comprises at least one compound selected from the group consisting of a compound represented by formula (3-1), a compound represented by formula (3-2), a compound represented by formula (4), a compound represented by formula (5-1), a compound represented by formula (5-2), a compound represented by formula (6-1), and a compound represented by formula (6-2):

$$Rf\text{—}X\text{—}SiR_aY_{3-a} \qquad (3\text{-}1),$$

wherein, in the formula (3-1), Rf represents a perfluoroalkyl group or a perfluoroalkoxy group, X represents a single bond or a divalent organic group, R represents a hydrolyzable group, Y represents a non-hydrolyzable group, and a represents an integer of 1, 2, or 3, where when a is 2 or 3, each R may represent same or different hydrolyzable group, and when a is 1, each Y may represent same or different non-hydrolyzable group;

$$F\text{—}Rf\text{—}X\text{—}SiR_aY_{3-a} \qquad (3\text{-}2),$$

wherein, in the formula (3-2), Rf represents a perfluoropolyether group, X represents a single bond or a divalent organic group, R represents a hydrolyzable group, Y represents a non-hydrolyzable group, and a represents an integer of 1, 2, or 3, where when a is 2 or 3, each R may represent same or different hydrolyzable group, and when a is 1, each Y may represent same or different non-hydrolyzable group;

$$Y_{3-a}R_aSi\text{-}A\text{-}Rf\text{-}A\text{-}SiR_aY_{3-a} \qquad (4),$$

wherein, in the formula (4), Rf represents a perfluoroalkylene group or a perfluoropolyether group, R represents a hydrolyzable group, Y represents a non-hydrolyzable group, A represents a single bond or a divalent organic group, a represents an integer of 1, 2, or 3, and R's, Y's, and A's may be independent of each other for each silicon atom to which they are bonded;

wherein, in the formula (5-1), Rf represents a perfluoroalkyl group or a perfluoroalkoxy group, R represents a hydrolyzable group, Y represents a non-hydrolyzable group, A represents a trivalent organic group, Q represents a divalent organic group, Z represents a hydrogen atom, an alkyl group having 1 to 6 carbon atoms, or a fluoroalkyl group having 1 to 6 carbon atoms, m represents an integer of 1 or more, a represents an integer of 1, 2, or 3, and when m represents an integer of 2 or more, A's, R's, and Y's may be independent of each other for each silicon atom to which they are bonded;

$$\text{F---Rf---Q} \hspace{-0.5em}-\hspace{-0.5em}\underset{\underset{\displaystyle SiR_aY_{3-a},}{|}}{(A)_m}\hspace{-0.5em}-\hspace{-0.5em}Z \tag{5-2}$$

wherein, in the formula (5-2), Rf represents a perfluoropolyether group, R represents a hydrolyzable group, Y represents a non-hydrolyzable group, A represents a trivalent organic group, Q represents a divalent organic group, Z represents a hydrogen atom, an alkyl group having 1 to 6 carbon atoms, or a fluoroalkyl group having 1 to 6 carbon atoms, m represents an integer of 1 or more, a represents an integer of 1, 2, or 3, and when m represents an integer of 2 or more, A's, R's, and Y's may be independent of each other for each silicon atom to which they are bonded;

$$\text{Rf-Q-(-A-SiR}_a\text{Y}_{3-a})_n \tag{6-1}$$

wherein, in the formula (6-1), Rf represents a perfluoroalkyl group or a perfluoroalkoxy group, R represents a hydrolyzable group, Y represents a non-hydrolyzable group, A represents a single bond or a divalent organic group, Q represents a divalent or trivalent organic group, n represents an integer of 1 or 2, a represents an integer of 1, 2, or 3, and when n represents 2, A's, R's, and Y's may be independent of each other for each silicon atom to which they are bonded;

$$\text{F-Rf-Q-(-A-SiR}_a\text{Y}_{3-a})_n \tag{6-2}$$

wherein, in the formula (6-2), Rf represents a perfluoropolyether group, R represents a hydrolyzable group, Y represents a non-hydrolyzable group, A represents a single bond or a divalent organic group, Q represents a divalent or trivalent organic group, n represents an integer of 1 or 2, a represents an integer of 1, 2, or 3, and when n represents 2 or 3, A's, R's, and Y's may be independent of each other for each silicon atom to which they are bonded.

2. The sealant according to claim 1, wherein the fluorine-containing compound comprises a perfluoropolyether group, and the perfluoropolyether group has an average molecular weight of 500 or more.

3. The sealant according to claim 1, wherein the fluorine-containing compound comprises a hydrolyzable silane compound.

4. The sealant according to claim 1, wherein the fluorine-containing compound comprises a condensation product formed of a hydrolyzable silane compound having a fluorine-containing group, a hydrolyzable silane compound having a cationically polymerizable group, and an alkyl-substituted hydrolyzable silane compound.

5. The sealant according to claim 4, wherein the fluorine-containing group comprises one of a perfluoroalkyl group, a perfluoroalkoxy group, a perfluoroalkylene group, and a perfluoropolyether group.

6. The sealant according to claim 4, wherein the fluorine-containing group comprises a perfluoropolyether group, and the perfluoropolyether group has an average molecular weight of 500 or more.

7. The sealant according to claim 1, wherein the cationically polymerizable resin comprises an epoxy resin.

8. The sealant according to claim 7, wherein a content of the fluorine-containing compound is 5 parts by mass or more with respect to 100 parts by mass of the epoxy resin.

9. The sealant according to claim 7, wherein the epoxy resin has an epoxy equivalent of 1,000 or more.

10. A sealant for use in an ink jet recording head, the sealant comprising:
a cationically polymerizable resin;
a fluorine-containing compound that is liquid at a temperature of 20° C.±15° C.; and
a cationic polymerization initiator,
wherein the fluorine-containing compound comprises a condensation product formed of a hydrolyzable silane compound having a fluorine-containing group and a hydrolyzable silane compound having a cationically polymerizable group, and
wherein the hydrolyzable silane compound having the fluorine-containing group comprises at least one compound selected from the group consisting of a compound represented by formula (3-1), a compound represented by formula (3-2), a compound represented by formula (4), a compound represented by formula (5-1), a compound represented by formula (5-2), a compound represented by formula (6-1), and a compound represented by the formula (6-2):

$$\text{Rf---X---SiR}_a\text{Y}_{3-a} \tag{3-1}$$

wherein, in the formula (3-1), Rf represents a perfluoroalkyl group or a perfluoroalkoxy group, X represents a single bond or a divalent organic group, R represents a hydrolyzable group, Y represents a non-hydrolyzable group, and a represents an integer of 1, 2, or 3, and when a is 2 or 3, each R may represent same or different hydrolyzable group, and when a is 1, each Y may represent same or different non-hydrolyzable group;

$$\text{F---Rf---X---SiR}_a\text{Y}_{3-a} \tag{3-2}$$

wherein, in the formula (3-2), Rf represents a perfluoropolyether group, X represents a single bond or a divalent organic group, R represents a hydrolyzable group, Y represents a non-hydrolyzable group, and a represents an integer of 1, 2, or 3, and when a is 2 or 3, each R may represent same or different hydrolyzable group, and when a is 1, each Y may represent same or different non-hydrolyzable group;

$$\text{Y}_{3-a}\text{R}_a\text{Si-A-Rf-A-SiR}_a\text{Y}_{3-a} \tag{4}$$

wherein, in the formula (4), Rf represents a perfluoroalkylene group or a perfluoropolyether group, R represents a hydrolyzable group, Y represents a non-hydrolyzable group, A represents a single bond or a divalent organic group, a represents an integer of 1, 2, or 3, and R's, Y's, and A's may be independent of each other for each silicon atom to which they are bonded;

$$\text{Rf---Q} \hspace{-0.5em}-\hspace{-0.5em}\underset{\underset{\displaystyle SiR_aY_{3-a},}{|}}{(A)_m}\hspace{-0.5em}-\hspace{-0.5em}Z \tag{5-1}$$

wherein, in the formula (5-1), Rf represents a perfluoroalkyl group or a perfluoroalkoxy group, R represents a hydrolyzable group, Y represents a non-hydrolyzable group, A represents a trivalent organic group, Q represents a divalent organic group, Z represents a hydrogen atom, an alkyl group having 1 to 6 carbon atoms, or a fluoroalkyl group having 1 to 6 carbon atoms, m represents an integer of 1 or more, a represents an integer of 1, 2, or 3, and when m represents an integer of 2 or more, A's, R's, and Y's may be independent of each other for each silicon atom to which they are bonded;

(5-2)

wherein, in the formula (5-2), Rf represents a perfluoropolyether group, R represents a hydrolyzable group, Y represents a non-hydrolyzable group, A represents a trivalent organic group, Q represents a divalent organic group, Z represents a hydrogen atom, an alkyl group having 1 to 6 carbon atoms, or a fluoroalkyl group having 1 to 6 carbon atoms, m represents an integer of 1 or more, a represents an integer of 1, 2, or 3, and when m represents an integer of 2 or more, A's, R's, and Y's may be independent of each other for each silicon atom to which they are bonded;

Rf-Q-(-A-SiR$_a$Y$_{3-a}$)$_n$   (6-1), wherein, in the formula (6-1), Rf represents a perfluoroalkyl group or a perfluoroalkoxy group, R represents a hydrolyzable group, Y represents a non-hydrolyzable group, A represents a single bond or a divalent organic group, Q represents a divalent or trivalent organic group, n represents an integer of 1 or 2, a represents an integer of 1, 2, or 3, and when n represents 2, A's, R's, and Y's may be independent of each other for each silicon atom to which they are bonded;

F—Rf-Q-(-A-SiR$_a$Y$_{3-a}$)$_n$   (6-2), wherein, in the formula (6-2), Rf represents a perfluoropolyether group, R represents a hydrolyzable group, Y represents a non-hydrolyzable group, A represents a single bond or a divalent organic group, Q represents a divalent or trivalent organic group, n represents an integer of 1 or 2, a represents an integer of 1, 2, or 3, and when n represents 2 or 3, A's, R's, and Y's may be independent of each other for each silicon atom to which they are bonded.

11. An ink jet recording head, comprising:
an ejection element substrate including:
  a flow-path-forming member for forming an ejection port for ejecting ink and a flow path communicating with the ejection port; and
  a substrate including an energy-generating element for generating energy for ejecting the ink and a supply port for supplying the ink to the flow path;
a support member for supporting the ejection element substrate; and
an electric wiring substrate electrically connected to the ejection element substrate,
  wherein a space between the ejection element substrate and the support member as well as an electrical connection portion between the ejection element substrate and the electric wiring substrate are sealed with a sealant, and
  wherein the sealant comprises:
  a cationically polymerizable resin;
  a fluorine-containing compound that is liquid at a temperature of 20° C.±15° C.;
  a cationic polymerization initiator; and wherein the fluorine-containing compound comprises at least one compound selected from the group consisting of a compound represented by formula (3-1), a compound represented by formula (3-2), a compound represented by formula (4), a compound represented by formula (5-1), a compound represented by formula (5-2), a compound represented by formula (6-1), and a compound represented by formula (6-2):

Rf—X—SiR$_a$Y$_{3-a}$   (3-1), wherein, in the formula (3-1), Rf represents a perfluoroalkyl group or a perfluoroalkoxy group, X represents a single bond or a divalent organic group, R represents a hydrolyzable group, Y represents a non-hydrolyzable group, and a represents an integer of 1, 2, or 3, where when a is 2 or 3, each R may represent same or different hydrolyzable group, and when a is 1, each Y may represent same or different non-hydrolyzable group;

F—Rf—X—SiR$_a$Y$_{3-a}$   (3-2), wherein, in the formula (3-2), Rf represents a perfluoropolyether group, X represents a single bond or a divalent organic group, R represents a hydrolyzable group, Y represents a non-hydrolyzable group, and a represents an integer of 1, 2, or 3, where when a is 2 or 3, each R may represent same or different hydrolyzable group, and when a is 1, each Y may represent same or different non-hydrolyzable group;

Y$_{3-a}$R$_a$Si-A-Rf-A-SiR$_a$Y$_{3-a}$   (4), wherein, in the formula (4), Rf represents a perfluoroalkylene group or a perfluoropolyether group, R represents a hydrolyzable group, Y represents a non-hydrolyzable group, A represents a single bond or a divalent organic group, a represents an integer of 1, 2, or 3, and R's, Y's, and A's may be independent of each other for each silicon atom to which they are bonded;

(5-1)

wherein, in the formula (5-1), Rf represents a perfluoroalkyl group or a perfluoroalkoxy group, R represents a hydrolyzable group, Y represents a non-hydrolyzable group, A represents a trivalent organic group, Q represents a divalent organic group, Z represents a hydrogen atom, an alkyl group having 1 to 6 carbon atoms, or a fluoroalkyl group having 1 to 6 carbon atoms, m represents an integer of 1 or more, a represents an integer of 1, 2, or 3, and when m represents an integer of 2 or more, A's, R's, and Y's may be independent of each other for each silicon atom to which they are bonded;

(5-2)

wherein, in the formula (5-2), Rf represents a perfluoropolyether group, R represents a hydrolyzable group, Y represents a non-hydrolyzable group, A represents a trivalent organic group, Q represents a divalent organic group, Z represents a hydrogen atom, an alkyl group having 1 to 6 carbon atoms, or a fluoroalkyl group having 1 to 6 carbon atoms, m represents an integer of 1 or more, a represents an integer of 1, 2, or 3, and when m represents an integer of 2 or more, A's, R's, and Y's may be independent of each other for each silicon atom to which they are bonded;

(6-1), wherein, in the formula (6-1), Rf represents a perfluoroalkyl group or a perfluoroalkoxy group, R represents a hydrolyzable group, Y represents a non-hydrolyzable group, A represents a single bond or a divalent organic group, Q represents a divalent or trivalent organic group, n represents an integer of 1 or 2, a represents an integer of 1, 2, or 3, and when n represents 2, A's, R's, and Y's may be independent of each other for each silicon atom to which they are bonded;

(6-2), wherein, in the formula (6-2), Rf represents a perfluoropolyether group, R represents a hydrolyzable group, Y represents a non-hydrolyzable group, A represents a single bond or a divalent organic group, Q represents a divalent or trivalent organic group, n represents an integer of 1 or 2, a represents an integer of 1, 2, or 3, and when n represents 2 or 3, A's, R's, and Y's may be independent of each other for each silicon atom to which they are bonded.

12. The ink jet recording head according to claim 11, wherein a surface of the sealant has a liquid repellency of a contact angle of 75° or more with respect to pure water.

13. The ink jet recording head according to claim 11, wherein a surface of the flow-path-forming member is subjected to liquid-repellent treatment with the fluorine-containing compound in the sealant.

14. An ink jet recording head, comprising:
an ejection element substrate including:
a flow-path-forming member for forming an ejection port for ejecting ink and a flow path communicating with the ejection port; and
a substrate including an energy-generating element for generating energy for ejecting the ink and a supply port for supplying the ink to the flow path;
a support member for supporting the ejection element substrate; and
an electric wiring substrate electrically connected to the ejection element substrate,
wherein a space between the ejection element substrate and the support member as well as an electrical connection portion between the ejection element substrate and the electric wiring substrate are sealed with a sealant, and
wherein the sealant comprises:
a cationically polymerizable resin;
a fluorine-containing compound that is liquid at a temperature of 20° C.±15° C.;
a cationic polymerization initiator; and
wherein the fluorine-containing compound comprises a condensation product formed of a hydrolyzable silane compound having a fluorine-containing group and a hydrolyzable silane compound having a cationically polymerizable group, and
wherein the hydrolyzable silane compound having the fluorine-containing group comprises at least one compound selected from the group consisting of a compound represented by formula (3-1), a compound represented by formula (3-2), a compound represented by formula (4), a compound represented by formula (5-1), a compound represented by formula (5-2), a compound represented by formula (6-1), and a compound represented by the formula (6-2):

(3-1), wherein, in the formula (3-1), Rf represents a perfluoroalkyl group or a perfluoroalkoxy group, X represents a single bond or a divalent organic group, R represents a hydrolyzable group, Y represents a non-hydrolyzable group, and a represents an integer of 1, 2, or 3, and when a is 2 or 3, each R may represent same or different hydrolyzable group, and when a is 1, each Y may represent same or different non-hydrolyzable group;

(3-2), wherein, in the formula (3-2), Rf represents a perfluoropolyether group, X represents a single bond or a divalent organic group, R represents a hydrolyzable group, Y represents a non-hydrolyzable group, and a represents an integer of 1, 2, or 3, and when a is 2 or 3, each R may represent same or different hydrolyzable group, and when a is 1, each Y may represent same or different non-hydrolyzable group;

(4), wherein, in the formula (4), Rf represents a perfluoroalkylene group or a perfluoropolyether group, R represents a hydrolyzable group, Y represents a non-hydrolyzable group, A represents a single bond or a divalent organic group, a represents an integer of 1, 2, or 3, and R's, Y's, and A's may be independent of each other for each silicon atom to which they are bonded;

(5-1)

wherein, in the formula (5-1), Rf represents a perfluoroalkyl group or a perfluoroalkoxy group, R represents a hydrolyzable group, Y represents a non-hydrolyzable group, A represents a trivalent organic group, Q represents a divalent organic group, Z represents a hydrogen atom, an alkyl group having 1 to 6 carbon atoms, or a fluoroalkyl group having 1 to 6 carbon atoms, m represents an integer of 1 or more, a represents an integer of 1, 2, or 3, and when m represents an integer of 2 or more, A's, R's, and Y's may be independent of each other for each silicon atom to which they are bonded;

(5-2)

wherein, in the formula (5-2), Rf represents a perfluoropolyether group, R represents a hydrolyzable group, Y represents a non-hydrolyzable group, A represents a trivalent organic group, Q represents a divalent organic group, Z represents a hydrogen atom, an alkyl group having 1 to 6 carbon atoms, or a fluoroalkyl group having 1 to 6 carbon atoms, m represents an integer of 1 or more, a represents an integer of 1, 2, or 3, and when m represents an integer of 2 or more, A's, R's, and Y's may be independent of each other for each silicon atom to which they are bonded;

$$Rf-Q+(A-SiR_aY_{3-a})_n \quad (6-1),$$

wherein, in the formula (6-1), Rf represents a perfluoroalkyl group or a perfluoroalkoxy group, R represents a hydrolyzable group, Y represents a non-hydrolyzable group, A represents a single bond or a divalent organic group, Q represents a divalent or trivalent organic group, n represents an integer of 1 or 2, a represents an integer of 1, 2, or 3, and when n represents 2, A's, R's, and Y's may be independent of each other for each silicon atom to which they are bonded;

$$F-Rf-Q+(A-SiR_aY_{3-a})_n \quad (6-2),$$

wherein, in the formula (6-2), Rf represents a perfluoropolyether group, R represents a hydrolyzable group, Y represents a non-hydrolyzable group, A represents a single bond or a divalent organic group, Q represents a divalent or trivalent organic group, n represents an integer of 1 or 2, a represents an integer of 1, 2, or 3, and when n represents 2 or 3, A's, R's, and Y's may be independent of each other for each silicon atom to which they are bonded.

15. The An-ink jet recording head according to claim 14, wherein a surface of the sealant has a liquid repellency of a contact angle of 75° or more with respect to pure water.

16. The An-ink jet recording head according to claim 14, wherein a surface of the flow-path-forming member is subjected to liquid-repellent treatment with the fluorine-containing compound in the sealant.

\* \* \* \* \*